(12) United States Patent
Chao et al.

(10) Patent No.: US 9,338,603 B2
(45) Date of Patent: May 10, 2016

(54) LOCATION BASED BRAND DETECTION

(71) Applicant: QUALCOMM Incorporated, San Diego, CA (US)

(72) Inventors: Hui Chao, San Jose, CA (US); Saumitra Mohan Das, Santa Clara, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 14/041,436

(22) Filed: Sep. 30, 2013

(65) Prior Publication Data

US 2015/0092061 A1 Apr. 2, 2015

(51) Int. Cl.
*H04N 7/18* (2006.01)
*H04W 4/02* (2009.01)
*G06Q 30/00* (2012.01)
*G06Q 10/06* (2012.01)

(52) U.S. Cl.
CPC ............... *H04W 4/025* (2013.01); *G06Q 10/06* (2013.01); *G06Q 30/00* (2013.01)

(58) Field of Classification Search
CPC ....... H04W 4/025; H04W 4/02; G06Q 10/06; G06Q 30/00; G06K 2209/25; G06F 17/30247

USPC .......................................................... 348/158
See application file for complete search history.

(56) References Cited

U.S. PATENT DOCUMENTS

| | | | |
|---|---|---|---|
| 2008/0059199 A1* | 3/2008 | Hataoka ................. | G01C 21/36 704/275 |
| 2010/0009713 A1 | 1/2010 | Freer | |
| 2012/0239501 A1 | 9/2012 | Yankovich et al. | |
| 2012/0310968 A1 | 12/2012 | Tseng | |
| 2013/0045751 A1* | 2/2013 | Chao ..................... | G01C 21/206 455/456.1 |
| 2013/0101163 A1 | 4/2013 | Gupta et al. | |

* cited by examiner

*Primary Examiner* — Andy Rao
*Assistant Examiner* — Jared Walker
(74) *Attorney, Agent, or Firm* — Hunter Clark PLLC

(57) ABSTRACT

Techniques for determining brand information and refining a position of a mobile device are described herein. An example of a method for displaying branding information on a mobile device includes receiving a reference image feature data table based on a rough location of the mobile device, such that the reference image feature data table includes a collection of entity records and wherein each entity record includes a plurality of logo image feature fields, obtaining an image including a displayed logo, utilizing an image recognition process and the reference image feature data table on the image to determine a recognized logo, and displaying brand information based on the recognized logo.

26 Claims, 10 Drawing Sheets

LOCATION BASED BRAND DETECTION

BACKGROUND

Mobile communication devices are one of the most prevalent consumer owned technologies in the digital information arena. Satellite and cellular telephone services and other similar wireless communication networks are widely available. The capabilities of the mobile communication devices, and the corresponding services, have also expanded to include applications such as image capture, connectivity to the internet, and providing location-based services. One service in this respect is to provide navigation information to a user through a mobile communication device operating in either a stand-alone mode or with assistance from other network-based devices.

Navigation information can be provided through a satellite positioning systems (SPS) such as, for example, the global positioning system (GPS), GLONASS, Galileo and other like Global Navigation Satellite Systems (GNSS). SPS enabled devices, for example, may receive wireless signals that are transmitted by satellites of a GNSS and/or by terrestrial based transmitting devices. A mobile device can be configured to utilize wireless base stations such as Network Access Points and Femto cells to determine the current location of the mobile device. For example, WiFi access points can be used to determine a rough location of a mobile device. The location information can be used to provide additional context to the mobile device. The location information can include creating business to consumer opportunities such as targeted marketing, general announcements, product identification, and other context specific information transfer.

SUMMARY

An example of a method for using a camera on a mobile device to display brand information according to the disclosure includes receiving a request for brand-related information, obtaining an annotated map comprising physical characteristics and wireless signal parameter information, measuring wireless signal parameters, determining a rough location based at least in part on the measured wireless signal parameters and the annotated map, receiving a reference image feature data table based on the rough location of the mobile device, such that the reference image feature data table includes a collection of entity records and wherein each entity record includes a one or more logo image feature fields, obtaining an image including a displayed logo, utilizing an image recognition process and the reference image feature data table on the image to determine a recognized logo, and displaying brand information based on the recognized logo.

Implementations of the method may include one or more of the following features. Obtaining an image including more than one logo, utilizing the image recognition process and the reference image feature data table on the image to determine more than one recognized logos, and displaying respective brand information for each of the recognized logos. Displaying brand information may include executing an augmented reality application that is associated with the brand information. Receiving a product image feature data table based on the recognized logo, such that the product image feature data table includes one or more reference image fields of products that are associated with the recognized logo. Obtaining an image of a product and utilizing the image recognition process and the product image feature data table on the image of the product to determine information about the product.

An example of mobile device for providing location-based brand detection according to the disclosure includes an image capture module, a memory configured to store a reference image feature data table, wherein the reference image feature data table comprises at least one entity record including one or more logo image feature fields, a processor programmed to measure wireless signal parameters, determine a rough location of the mobile device based on the wireless signal parameters, receive the reference image feature data table, wherein the at least one entity record is associated with the rough location, perform an image recognition process on an image obtained by the image capture module based on the reference image feature data table, and display brand information based on a result of the image recognition process.

An example of a method of providing reference image feature data to a mobile device according to the disclosure includes obtaining a rough location area of the mobile device, selecting a relevant points of interest list based on the rough location area of the mobile device, refining the rough location area of the mobile device if the relevant points of interest list is greater than a threshold, building a reference image feature data table if the relevant points of interest list is less than or equal to the threshold, and providing the reference image feature data table to the mobile device.

Implementations of the method may include one or more of the following features. The reference image feature data table may include at least one entity and one or more logo image feature fields that are associated with the entity. The reference image feature data table may include position information associated with each logo image feature. Refining the rough location area may include receiving a wireless signal information from the mobile device. The wireless signal information may include Round Trip Time (RTT) data.

An example of an apparatus for displaying brand information according to the disclosure includes a memory, at least one processor coupled to the memory and configured to receive a request for brand-related information, obtain an annotated map including physical characteristics and wireless signal parameter information, measure wireless signal parameters, determine a rough location of a mobile device based at least in part on the measured wireless signal parameters and the annotated map, receive a reference image feature data table based on the rough location of the mobile device, wherein the reference image feature data table includes a collection of entity records and wherein each entity record includes a plurality of logo image feature fields, obtain an image including a displayed logo, utilize an image recognition process and the reference image feature data table on the image to determine a recognized logo, and display brand information based on the recognized logo.

An example of an apparatus for displaying brand information according to the disclosure includes a memory, at least one processor coupled to the memory and configured to receive a request for brand-related information, obtain an annotated map comprising physical characteristics and wireless signal parameter information, measure wireless signal parameters, determine a rough location of a mobile device based at least in part on the measured wireless signal parameters and the annotated map, receive a reference image feature data table based on the rough location of the mobile device, wherein the reference image feature data table includes a collection of entity records and wherein each entity record includes one or more logo image feature fields, obtain an image including a displayed logo, utilize an image recognition process and the reference image feature data table on the image to determine a recognized logo, and display brand information based on the recognized logo.

An example of an apparatus according to the disclosure includes a memory, at least one processor coupled to the memory and configured to, obtain a rough location area of a mobile device, select a relevant points of interest list based on the rough location area of the mobile device, refine the rough location area of the mobile device if the relevant points of interest list is greater than a threshold, build a reference image feature data table if the relevant points of interest list is less than or equal to the threshold, and provide the reference image feature data table to the mobile device.

An example of a computer program product residing on a processor-executable computer storage medium according to the disclosure includes processor-executable instructions configured to cause a processor to receive a request for brand-related information, obtain an annotated map comprising physical characteristics and wireless signal parameter information, measure wireless signal parameters, determine a rough location of a mobile device based at least in part on the measured wireless signal parameters and the annotated map, receive a reference image feature data table based on the rough location of the mobile device, wherein the reference image feature data table includes a collection of entity records and wherein each entity record includes one or more logo image feature fields, obtain an image including a displayed logo, utilize an image recognition process and the reference image feature data table on the image to determine a recognized logo, and display brand information based on the recognized logo.

An example of a computer program product residing on a processor-executable computer storage medium according to the disclosure includes processor-executable instructions configured to cause a processor to obtain a rough location area of a mobile device, select a relevant points of interest list based on the rough location area of the mobile device, refine the rough location area of the mobile device if the relevant points of interest list is greater than a threshold, build a reference image feature data table if the relevant points of interest list is less than or equal to the threshold, and provide the reference image feature data table to the mobile device.

Items and/or techniques described herein may provide one or more of the following capabilities, as well as other capabilities not mentioned. A collection of venues can be created. A list of Points of Interest (POI) can be created based on the venues. A rough location of a mobile device can be determined. The list of POIs can be filtered based on the location of the mobile device. A POI can be associated with image features which are used in image recognition algorithms. An image of a location can be obtained. The image can include a logo or other brand identity associated with an entity. A POI can be associated with an entity. An entity can be associated with multiple logos or other object features. Products can be associated with entities. Feature recognition can be performed on an image of a location to determine an entity. Location based services, such as augmented reality information, can be provided to a mobile device based on a recognized logo or other object features. Images of products can be captured. Image features associated with an entity can be used to recognize the products in the images. The position of a mobile device can be determined based on a recognized logo or other object feature. Other capabilities may be provided and not every implementation according to the disclosure must provide any, let alone all, of the capabilities discussed. The results of the image recognition algorithms can be utilized in a wide range of location based services and marketing applications. Further, it may be possible for an effect noted above to be achieved by means other than that noted, and a noted item/technique may not necessarily yield the noted effect.

DETAILED DESCRIPTION

Figure 1:
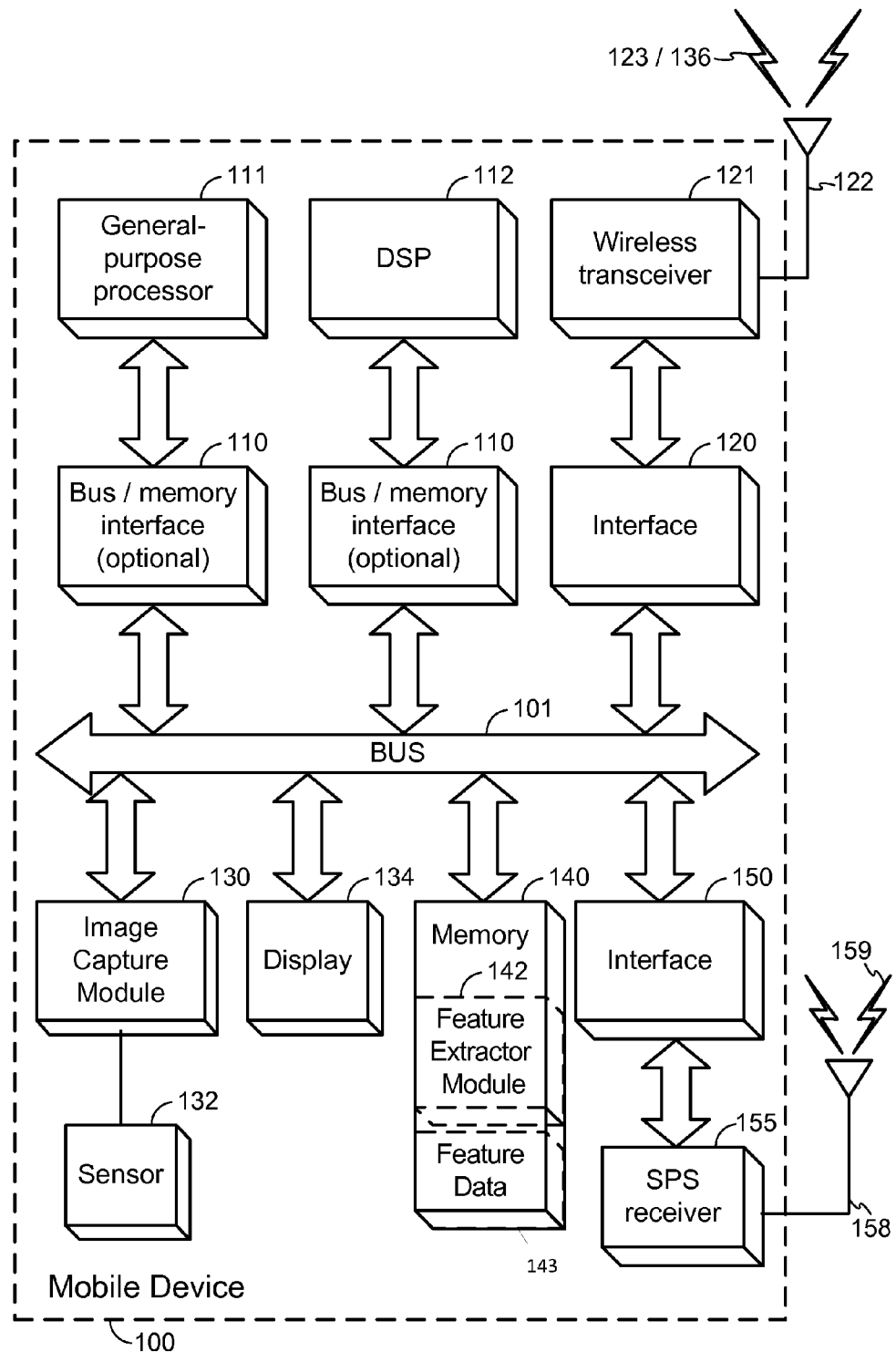
FIG. 1 is a schematic block diagram illustrating an exemplary mobile device capable of obtaining images, communicating with a network and receiving satellite positioning system (SPS) signals.

An example of a context aware mobile device includes an image capture module, a memory configured to store a received reference image data table based on a rough location of the mobile device, a processor programmed to perform an object recognition process on an image obtained by the image capture module based on the received target image database. In an example, the mobile device can refine a current position based on the results of the object recognition process. For example, the mobile device can include the ability to detect visual cues using rough position and improving position calculations using visual cues.

In a shopping center, for example, one of the best visual cues is brand specific visual signature, such as logos, brand related objects, or consistent storefront appearance for a brand. In another example, location based services, and/or position estimates can be improved in venues with room numbers and gate numbers like (airports, hospital and enterprises) through recognition of visual cues such as the room number or terminal number.

In some commercial complexes such as shopping malls and business districts of urban areas, POIs can be associated with retail stores. In general, a consistent brand image is often presented at a retail storefront. This consistency may allow for a small set of logos/storefront images to be stored in a memory device, with the effect of improving the brand/logo recognition in a large number of shopping malls and business districts without having to visit each individual venue to obtain a photo of each logo. In operation, the stored brand images (e.g., logos) can be used for storefront identification, and then mapped to the floor plan of a venue or their detection is used to trigger other application events. For example, a user can capture an image of a logo with the camera of a mobile device, a processor either on the mobile device or on a remote server can be configured to perform an object recognition process on the logo, and then the mobile device can display an estimated position on a floor map or trigger another application. The other applications can include augmented reality data, or other interactive information such as a web link or access to a database with additional store or product information. In general, object recognition algorithms can be processor intensive as they may be required to search through large databases of object images. The speed and efficiency of the object recognition can be improved if the number of possible target objects is reduced. In an embodiment, location based filtering can be used to reduce the size of the object database. The location of the mobile device can be determined by position determining systems such as GPS, or other terrestrial systems. For example, the location of the mobile device may be based on a WiFi network detected by the mobile device. Some example techniques are presented herein which may be implemented in various method and apparatuses in a mobile device to possibly provide for or otherwise support determining a position based on visual information in an image. These examples, however, are not exhaustive.

For example, in certain implementations, as illustrated in FIG. 1, a mobile device 100 may contain a wireless transceiver 121 which is capable of sending and receiving wireless signals 123 via a wireless antenna 122 over a wireless network and connected to a bus 101 by a wireless transceiver bus interface 120. The wireless transceiver bus interface 120 may, in some embodiments be a part of the wireless transceiver 121. Some embodiments may have multiple wireless transceivers 121 and wireless antennas 122 to support multiple standards such as but not limited to, wireless LAN standards such as 802.11/WiFi), personal area networks such as Zigbee™ and Bluetooth™, and Wide area network standards such as CDMA, WCDMA, LTE and Bluetooth. The wireless transceiver 121 can be a means for receiving reference image feature data.

Also illustrated in FIG. 1, certain embodiments of mobile device 100 may contain an image capture module 130 integrated with the mobile device 100. The image capture module 130 can be configured to receive a signal from a sensor 132 such as a camera chip and accompanying optical path. In general, the image capture module 130 and sensor 132 allow a user to obtain an image, or otherwise transform a visual input to a digital form. The images can be viewed via a graphic display 134. The graphic display 134 can be configured to be a user interface (e.g., touch screen), and allow the user to view various still, animated and/or video images such as but not limited to textual output, camera output, maps, augmented reality overlays, and user video. The graphic display 134 can be used for displaying brand information to a user. The image capture module 130 can be a means for obtaining an image including a displayed logo on a storefront. Images that are obtained by the image capture module 130 can be stored in the memory 140.

Also illustrated in FIG. 1, certain embodiments of mobile device 100 may contain a Satellite Positioning System (SPS) receiver 155 capable of receiving Satellite Positioning System (SPS) signals 159 via SPS antenna 158. SPS receiver 155 may also process, in whole or in part, the Satellite Positioning System (SPS) signals 159 and use the SPS signals 159 to determine the location of the mobile device. SPS signals may be from GNSS such as, but not limited to, GPS, Galileo, Beidou and Glonass or a mix thereof. In some embodiments, general-purpose processor(s) 111, memory 140, DSP(s) 112 and specialized processors (not shown) may also be utilized to process the SPS signals 159, in whole or in part, and/or calculate the location of the mobile device 100, in conjunction with SPS receiver 155. The storage of SPS or other location signals may be done in memory 140 or registers.

Also shown in FIG. 1, mobile device 100 may contain DSP(s) 112 connected to the bus 101 by a bus interface 110, general-purpose processor(s) 111 connected to the bus 101 by a bus interface 110 and memory 140, also sometimes connected to the bus by a bus interface 110. The bus interfaces 110 may be integrated with the DSP(s) 112, general-purpose processor(s) 111 and memory 140 with which they are associated. In various embodiments, functions may be stored as one or more instructions or code in memory 140 such as on a computer-readable storage medium, such as RAM, ROM, FLASH, or disc drive, and executed by general-purpose processor(s) 111, specialized processors, or DSP(s) 112. Memory 140 is a processor-readable memory and/or a computer-readable memory that stores software code (programming code, instructions, etc.) configured to cause the processor(s) 111 and/or DSP(s) 112 to perform functions described. In particular, the memory 140 can include a Feature Extractor Module 142 and a Feature data table 143. The Feature Extractor module 142 can be computer-readable instructions configured to enable the processor 111, or other DSP(s) 112, to perform image recognition on images captured via the image capture module 130. In general, the computer-readable instructions in the Feature Extractor module 142 enable the processor 111, or other processors, to function as an image recognition engine. For example, features may be extracted using suitable techniques, such as Scale-Invariant Feature Transform (SIFT), Speeded-UP Robust Feature (SURF), Nearest Feature Trajectory (NFT), etc. . . . These techniques are exemplary only and not limiting as other techniques such as proprietary corner detection-type approaches may be used. The feature extractor module 142 can be a means utilizing an image recognition process to recognize a logo. The Feature data table 143 can be a portion of the memory 140 that is configured to store a reference image data table to be used by the Feature Extractor Module 142 during the image recognition process. The Feature data table 143 can be a plurality of logo and/or product image feature fields that are associated with one or more entities.

In general, the mobile device 100 is representative of any electronic device that may be reasonably moved about by a user. By way of example but not a limitation, mobile device 100 may comprise a computing and/or communication device such as a mobile telephone, a smart phone, a lap top computer, a tablet computer, a wearable computer, a personal digital assistant, a navigation device, a watch, etc.

The mobile device 100 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

In other embodiments, functions may be performed in hardware.

Figure 2:
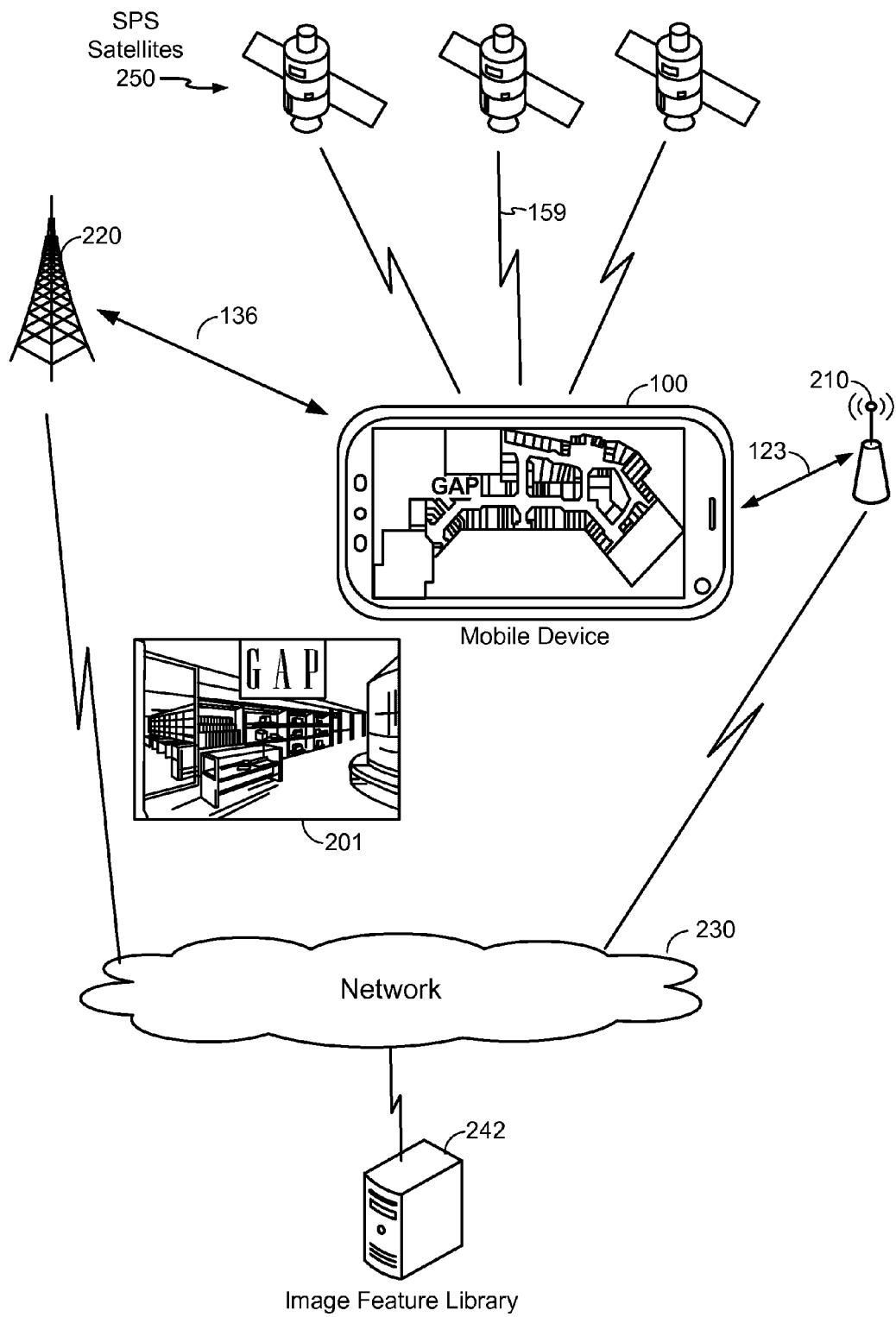
FIG. 2 is a system diagram illustrating certain features of a system containing a mobile device capable of capturing images and communicating over one or more wireless networks.

In certain implementations, as shown in FIG. 2, the mobile device 100 may include means for obtaining a rough location such as by receiving SPS signals 159 from SPS Satellites 250. The SPS Satellites may be from one global navigation satellite system (GNSS), such as the GPS or Galileo satellite systems. The SPS Satellites may be from multiple GNSS such as, but not limited to, GPS, Galileo, Glonass, or Beidou (Compass) satellite systems.

In addition, the mobile device 100 may connect via a wireless signal 136 to a cellular network (e.g., a cell tower can be a wireless transmitting device 220). The cellular network may provide access to a network 230. Network connectivity may also be available to the mobile device 100 over a wireless transmitter 210 (e.g., a Femto cell, WiFi network, other access point/router) via wireless signals 123. The wireless transmitter 210 may connect to the network 230. The network 230 can include connectivity to the Internet. The network 230 can include connectivity to a position server (not shown) configured to send, receive and store position information. The mobile device 100 can send wireless network measurements and/or other wireless signal information (e.g., RSSI, RTT) to the position server. In some instances, the means for obtaining a rough location of the mobile device can be received wireless signals. The wireless signals may be processed by or at a mobile communication device, and its location may be estimated using known techniques, such as, for example, trilateration, base station identification, or the like. An image feature library server 242 can be included as part of the position server, or may exist in another server and configured to communicate with the position server. In a server implementation, a means for obtaining the rough location area of a mobile device includes receiving wireless signal information from the mobile device (e.g., SSID, RSSI, RTT, or a position calculated on the mobile device). The image feature library server 242 can include a collection of reference feature images, which can be indexed based on venue, location, entities, and products. The image feature library server 242 can be many servers disposed in different areas. The mobile device 100 is configured to obtain and display an image of an area 201 around the device 100. In general, the area 201 can include a storefront with a logo, or other branding, which is related to an entity. The image of the area 201 can be analyzed with a local feature extractor 142 (i.e., local processing), or sent to the position server or the Image Feature Library server 242 for image processing and feature identification (i.e., remote processing).

Figure 3:
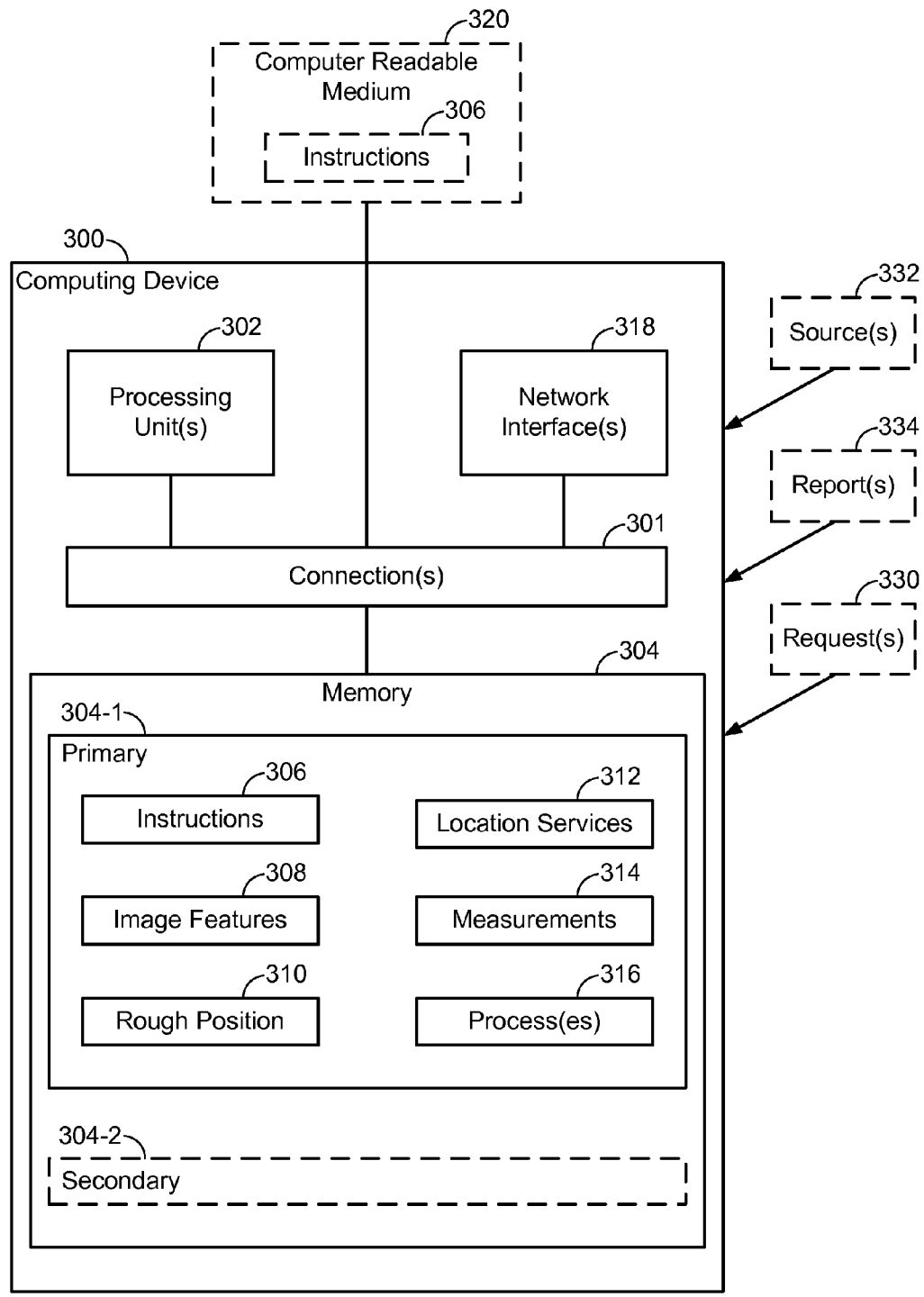
FIG. 3 is a schematic block diagram of a computing device.

Referring to FIG. 3, with further reference to FIG. 2, a schematic block diagram illustrating certain features of a computing device 300 is shown. The image feature library server 242 can include a computing device 300.

As illustrated computing device 300 may comprise one or more processing units 302 to perform data processing coupled to memory 304 via one or more connections 301.

Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 and secondary memory 304-2 may comprise, for example, a random access memory, read only memory, one or more data storage devices or systems, such as, for example, a disk drive, an optical disc drive, a tape drive, a solid state memory drive, etc. The memory 304 may, for example, comprise a data base and/or other like capability. The memory 304 can include elements disposed in different geographic locations. While illustrated in this example as being separate from the processing units, all or part of the memory 304 may be provided within or otherwise co-located/coupled with processing unit(s) 302, or other like circuitry within computing device 300 and/or operatively coupled thereto.

In certain implementations, the memory 304 may be operatively receptive of, or otherwise configurable to couple to, computer readable medium 320. As illustrated, memory 304 and/or computer readable medium 320 may comprise instructions 306 associated with data processing (e.g., in accordance with the techniques provided herein).

As further illustrated, at certain times, memory 304 may comprise data representing image features information 308 and rough position information 310. The image feature information 308 can be stored in a relational database structure and may be indexed based on features associated with image features. For example, an image feature may be indexed based on a corresponding venue, location, entity, and/or product. The image feature information 308 may exist in one or more image feature library servers 242. The rough position information 310 can be associated with a geographical area (e.g., a point, a polygon, a POI, an entity, a shopping area, a public park). In general, electronic data and information can be associated with objects and other information via field values and indexes. In certain example implementations, the rough position information 310 may correspond to Location Context Indicator (LCI) in a map database. The rough position information 310 may include position information that is associated with a storefront. That is, the area from which a storefront (e.g., logo) is visible. The rough position information 310, the image feature information 308, the location services information 312, and other information stored in memory 304 need not be stored in a single image feature library server 242, and can be distributed over other servers and accessible via a network interface 318.

In an embodiment, one or more requests 330 may be obtained (e.g., via network interface 318) for image feature information 308, rough position information 310, and/or possibly other location services information 312. Requests 330 may be received over the network 230 from one or more mobile devices 100. Computing device 300 may, for example, respond to request 330 by providing all or part of the requested information. The network interface 318 may be a means for providing reference feature data to a mobile device.

Location services information 312 may comprise, for example, location information as submitted or otherwise associated with a source 332 and previously stored, or estimated, location information (e.g., subsequently determined, or reported) with respect to one or more wireless transmitting devices 210, 220. Location services information 312 may comprise, for example, location information with respect to one or more geographic areas or entities. Location services information 312 can be a context annotation layer of a map database, a geo-referenced graphic map file and other like navigation/position related information. Location services information 312 can be information relating to navigation, e.g., information associated with one or more location based services and/or other like capabilities. For example, certain context or other like information associated with a specific geographic region, etc., may be stored in memory 304 (e.g., points of interest, routing information, multimedia files, or other general information associated with a geographic area). Location services information may include commercial information associated with an entity, or other augmented reality information. The location services information 312 may persist in the memory 304, or may be stored on a remote server that is configured to communicate with the image feature library server 242 via the network 230.

As further illustrated, at times, memory 304 may comprise measurements 314 associated with one or more signals received by one or more wireless transmitting devices 210, 220. By way of example, measurements 314 may comprise signal strength information, timing information, ranging and/or pseudoranging information, etc. Measurements 314 may, for example, be obtained through one or more reports 334 received via network interface 318 from one or more mobile devices 100 and/or other computing devices. In certain example implementations, at least a portion of measurements 314 may be used to estimate a location of mobile device 100. Measurements 314 may also represent information that was carried using one or more wireless signals 123, 136, such as an SSID or other information broadcast by an access point. The measurements 314 may include position information provided by mobile devices that is associated with a logo (e.g., to determine an area from which the logo was viewed).

In general, the mobile device 100 is configured to determine its current location, and can provide the location information to the image feature library server 242. In some implementations, all or part of a process for estimating a location of mobile device 100 may be performed by a remote position server.

While process 316 is illustrated in FIG. 3 as being at least partially stored in memory 304, the process(es) may be operatively provided in whole or part in one or more of processing unit(s) 302 and/or other like circuitry. The processes 316 can be used to execute image recognition algorithms, such as Scale-Invariant Feature Transform (SIFT), Speeded-UP Robust Feature (SURF), Nearest Feature Trajectory (NFT), or other algorithms. The computing device 300 may, for example, comprise one or more network interfaces 318 coupled to one or more of connections 301. The network interfaces 318 may be representative of one or more wireless and/or wired network interfaces.

In certain example implementations, one or more reports 334 (e.g., from one or more mobile stations) may identify the presence of a wireless transmitting device 210, 220 that may be newly installed. Location services information associated with such a wireless transmitting device may be relayed by a mobile device or possibly discovered though other network connections/resources, and/or otherwise estimated, e.g., using previous location information stored in the mobile device 100 or on a position server.

Figure 4:
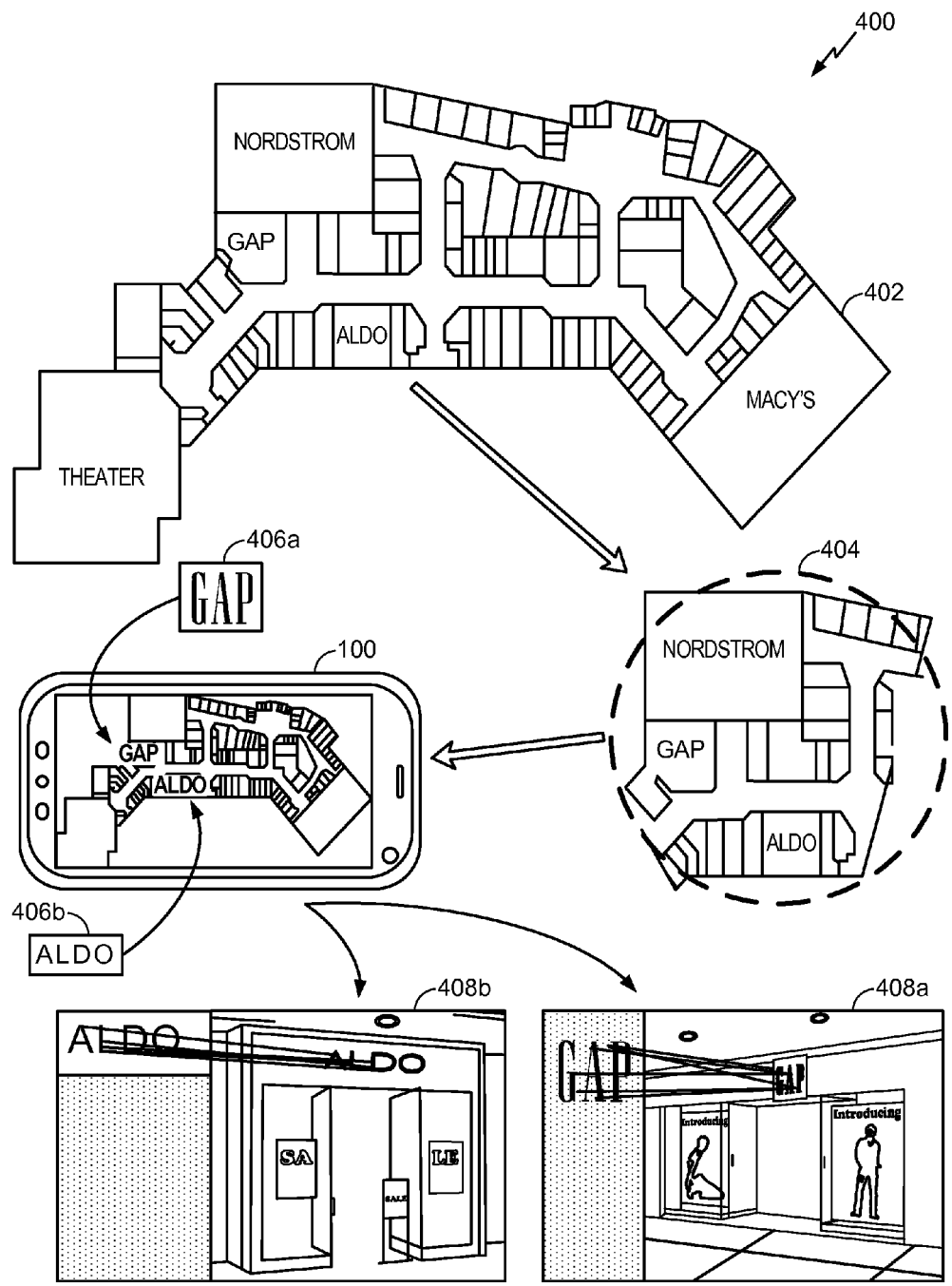
FIG. 4 is an exemplary use case for building a reference image data table based on a rough position within a venue.

Referring to FIG. 4, an exemplary use case 400 for building a reference image data table based on a rough position within a venue is shown. The use case 400 is, however, an example only and not limiting. The use case 400 can be altered, e.g., by having elements added, removed, rearranged, combined, performed concurrently, and/or having single elements split into multiple elements.

A context aware mobile device 100 can receive location service information 312 from an image feature library server 242 based on the current location of the mobile device 100. The location service information 312 can be associated with a venue such as a shopping mall, downtown area, sports arena, park, or other geographic area. For example, the mobile device 100 receives a floor plan 402 for a shopping mall. The floor plan 402 can be associated with the particular shopping mall (i.e., the venue) and the corresponding business entities within the shopping mall (i.e., the entities). The entities may also be associated with a location within the venue. For example, the location of the mobile device may be within a rough location area 404 within the venue. The rough location can be determined by using local access points (e.g., trilateration, cell sector center, angle of arrival, fingerprinting, cell/AP location, location gridding, and other location techniques), as well as by using SPS resources such as GPS or the combination of the above with tracking information using sensors such as IMU (Inertial measurement unit), magnetometer, optical, etc. on the phone. The number of entities associated with a rough location can be less than the number of entities in the venue. In the use case 400 depicted in FIG. 4, there is a first entity 406a and a second entity 406b within the rough location area 404. The first entity 406a corresponds to a first commercial brand (e.g., GAP®), and the second entity 406b corresponds to a second commercial brand (e.g., ALDO®).

In operation, the first and second entities 406a, 406b within the rough location area 404 can be used to create a relevant reference image database. The image feature library server 242 can receive a request 330 including a rough position of the mobile device 100. A list of entities associated with the rough location area 404 can be determined and the image feature information 308 associated with the list of entities can be assembled into a data set. Image features in the data set are used in image recognition algorithms to improve the efficiency (e.g., processing time, processing overhead) of the image recognition processes. That is, the data set of entities can constrain the solution set and thus improve the recognition results. For example, the image capture module 130 of the mobile device 100 can be directed at a first storefront 408a and determine that the storefront is associated with the first entity 406a (i.e., GAP). Similarly, an image of a second storefront 408b can be associated with the second entity 406b (i.e., ALDO). The image recognition can be performed locally (e.g., on the mobile device 100), or remotely (e.g., on the image feature library server 242).

Figure 5:
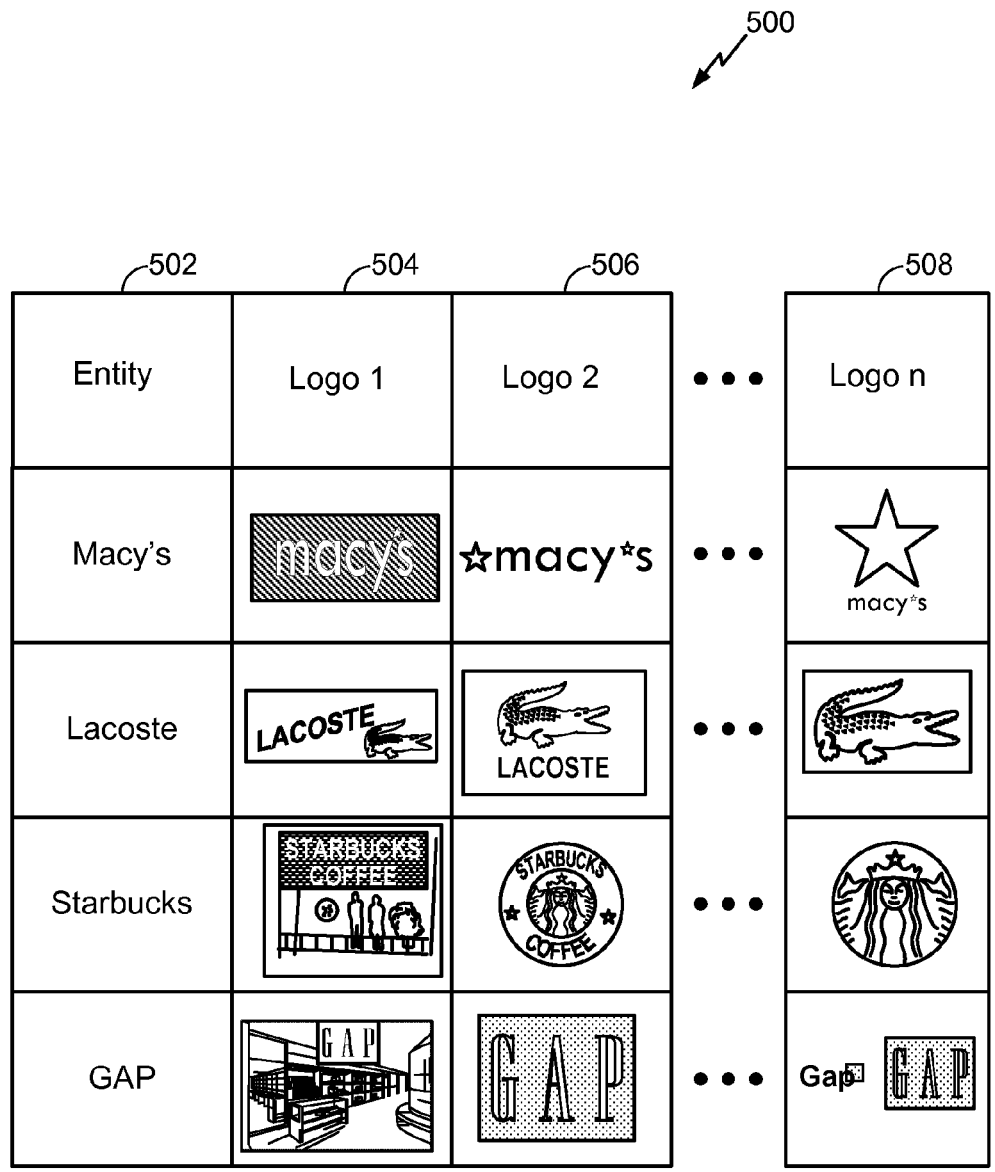
FIG. 5 is an exemplary data table of reference image features associated with an entity.

Referring to FIG. 5, an exemplary data table 500 of reference image features associated with an entity is shown. The data table 500 can persist as a data structure in the image feature information 308, or within the mobile device memory 140, as part of a database application (e.g., SQL, Oracle) or other data scheme (e.g., XML, flat files). As an example, and not a limitation, the data table 500 can include a collection of entity records (e.g., data records) with each record including data fields such as entity field 502, a first logo image feature field 504 (e.g., Logo 1), a second logo image feature field 506 (e.g., Logo 2), and additional logo image features fields 508 (e.g., Logo n). As used herein, the term 'logo' can refer to any visual representation of an entity including standard characters, an icon, a logo, a trademark, or other recognizable trade dress items. Other data fields such as indexes, comments, and other metadata may be included in the data table 500. The data table 500 represents a use case when an entity is known (e.g., based on a rough location) and the image recognition process can be improved by including the logos associated with the entity into the image feature data. The first, second and additional logo image feature fields 504, 506, 508 represent the different iterations of logos or other brand identities that are associated with an entity. The logo image feature fields 504, 506, 508 may be created and administered as a central database which can be distributed over a network, or the collection of logo image feature fields 504, 506, 508 may be created via a distributed network (e.g., crowdsourcing) and assembled and disseminated as background operations within a server network. The data table 500 is exemplary only, and not a limitation. The data table 500 can be the result of a cross-tab query based on related tables of entities and image feature information (e.g., logos, products). The data table 500 may be indexed based on venue, location, entity and/or products. For example, a logo can be associated with (e.g., related to) one or more locations to facilitate searching the database for a logo based on a location. Other indexing schemes may be used.

The logo image feature fields 504, 506, 508 provide a set of reference objects to be used in image recognition algorithms (e.g., SIFT, SURF, NFT). All or portions of the data table 500 can be provided to the mobile device 100 for local image recognition (i.e., image recognition performed on the mobile device). The image recognition may be performed on the image feature library server 242, or other network resource. The type and number of logo image feature fields 504, 506, 508 are exemplary only and not a limitation as each entity may have different types and numbers of logos or other brand identities.

In an embodiment, the data table 500 can include position information that is associated with the entity and/or logos. For example, a logo record may include a link to a location data table containing position information. The position information can represent an area of detection that a user is likely to be in to capture an image of a logo. The area of detection can be used to refine the position estimate of the mobile device. The position information associated with multiple entities and/or logos may be used to further refine the position estimate (e.g., the intersection of two or more areas of detection). The position information can be stored in the image feature library server 242, and can be established and/or refined through crowd sourcing as multiple users perform image recognition on a particular logo and report their position information. The image feature library server 242 can be configured to receive the position information as a measurement 314 and may be utilized to refine the position information associated with a logo.

Figure 6A:
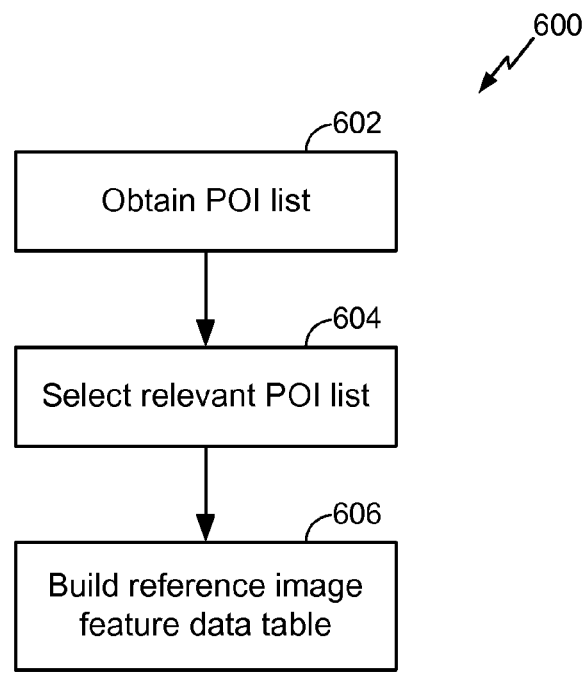
FIG. 6A is a block flow diagram of a process for building a reference image feature data table.

Referring to FIG. 6A, an exemplary process 600 for building a reference image feature data table is shown. The process 600 is, however, an example only and not limiting. The process 600 can be altered, e.g., by having elements added, removed, rearranged, combined, performed concurrently, and/or having single elements split into multiple elements.

At stage 602, the image feature library server 242 can obtain a Point of Interest (POI) list from the location services information 312. The mobile device 100 can provide information about a venue and the image feature library server 242 can be configured to query the location services information 312 to create the POI list. For example, a user of the mobile device 100 can enter (e.g., type, speak, select) the name of a venue. A venue may also be inferred based on the location of the mobile device 100. One or more points of interest (POI) can be associated with a venue. A POI generally relates to a geographic location within the venue. For example, a venue can be a shopping district and a POI list can correspond to the names and locations of the business entities in the shopping district. Other venue-POI relationships can exist. A venue can be a theme park and a POI can be an attraction. A venue can be a golf course and a POI can be a tee or green. A venue can be a race car track and a POI can be a car on the track. The location services information 312 can include information regarding one or more venue-POI relationships.

At stage 604, the image feature library server 242 can be configured to select a relevant POI list. The complete extent of a venue-POI relationship may encompass a large number of POIs for a single venue. In some applications, only subsets of the POIs are relevant to the mobile device. For example, referring to FIG. 4, the relevant entities to the mobile device 100 include the first entity 406a and the second entity 406b. Relevant entities can be determined, for example, based on the rough location area 404 of the mobile device 100. The image feature library server 242 or the mobile device 100 can be the means for selecting relevant POIs based on the rough location. Other information such as time of day, orientation of the mobile device, user profile information, user history information, social media data (entity and/or user specific), and user input can be used to select a relevant POI list.

At stage 606, the image feature library server 242 can be configured to build a reference image feature data table. Referring to FIG. 5, the image features information 308 can be indexed based on a POI (e.g., the entity field 502). The feature data table can include a collection of data records, with each record including an index and other data fields such as the entity field 502, the first logo image feature field 504, the second logo image feature field 506, and additional logo image feature fields 508. The reference image feature data table can include records for the POIs in the relevant POI list selected at stage 604. The reference image feature data table can be used with image recognition algorithms executing on the image feature library server 242, or the image feature data table can be sent to the mobile device 100.

Figure 6B:
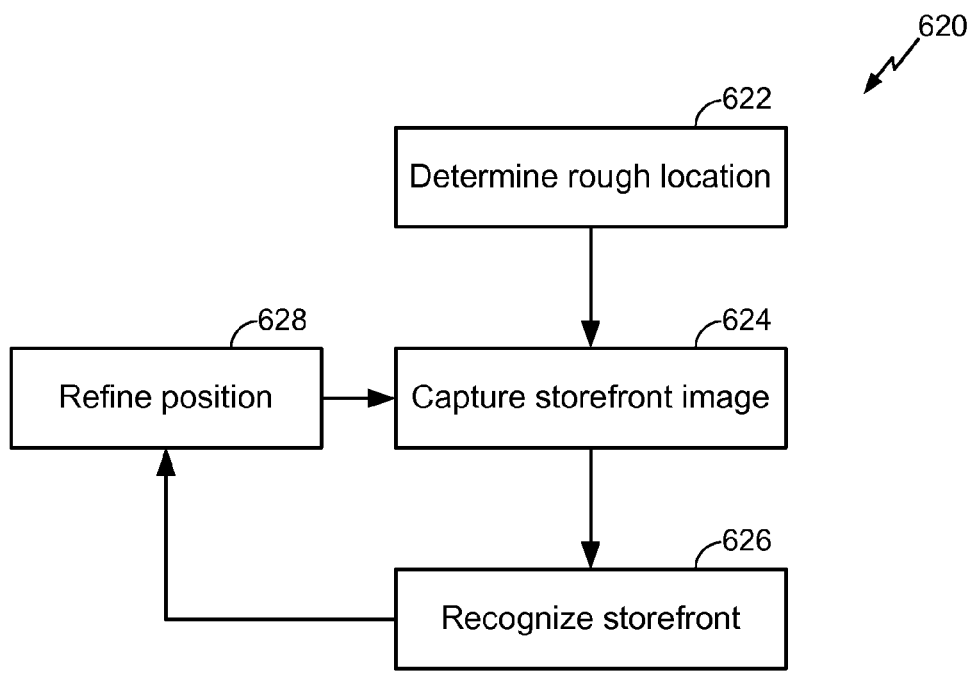
FIG. 6B is a block flow diagram of a process for recognizing a storefront.

Referring to FIG. 6B, an exemplary process 620 for recognizing a storefront is shown. The process 620 is, however, an example only and not limiting. The process 620 can be altered, e.g., by having elements added, removed, rearranged, combined, performed concurrently, and/or having single elements split into multiple elements.

At stage 622, the mobile device can determine a rough location. For example, referring to FIG. 4, the mobile device 100 can obtain WiFi measurements from access points within the venue 400. The WiFi measurements can be transmitted across the network 230b. The image feature library server 242 can include functions of a position server and can be configured to receive the WiFi measurements and determine the rough location area 404. The mobile device 100 may also be configured to determine the rough location area 404. The first and second entities 406a, 406b within the rough location area 404 are examples of relevant POIs. The image feature library server 242 can be configured to build and provide a reference image feature data table to the mobile device 100.

At stage 624, the mobile device 100 is configured to capture a store front image. For example, a series of video frames can be obtained via a panning sequence to view one or more storefronts and the corresponding logos or branding information. In some instances no camera actuation (e.g., taking a picture etc. . . . ) may be needed or otherwise used to extract visual features. Features associated with one or more storefronts may be extracted while panning, pointing, or otherwise moving the mobile device 100.

At stage 626, the mobile device 100 is configured to recognize the logo or other trade information associated with the storefront. The recognized logo may also assist the location refinement at stage 628. The image recognition algorithms can be executing locally (e.g., with the feature extraction module 142), or remotely by resources on the network 230*b*. The reference image feature data table is used in the object recognition process. The first, second and additional logo image feature fields 504, 506, 508 can be used to constrain the object recognition solution set. The limitations on the number of possible solutions can speed-up the image processing algorithms. The results of the image recognition can result in a recognized storefront and the mobile device may then receive additional location services information 312 based on the recognized storefront.

Figure 7:
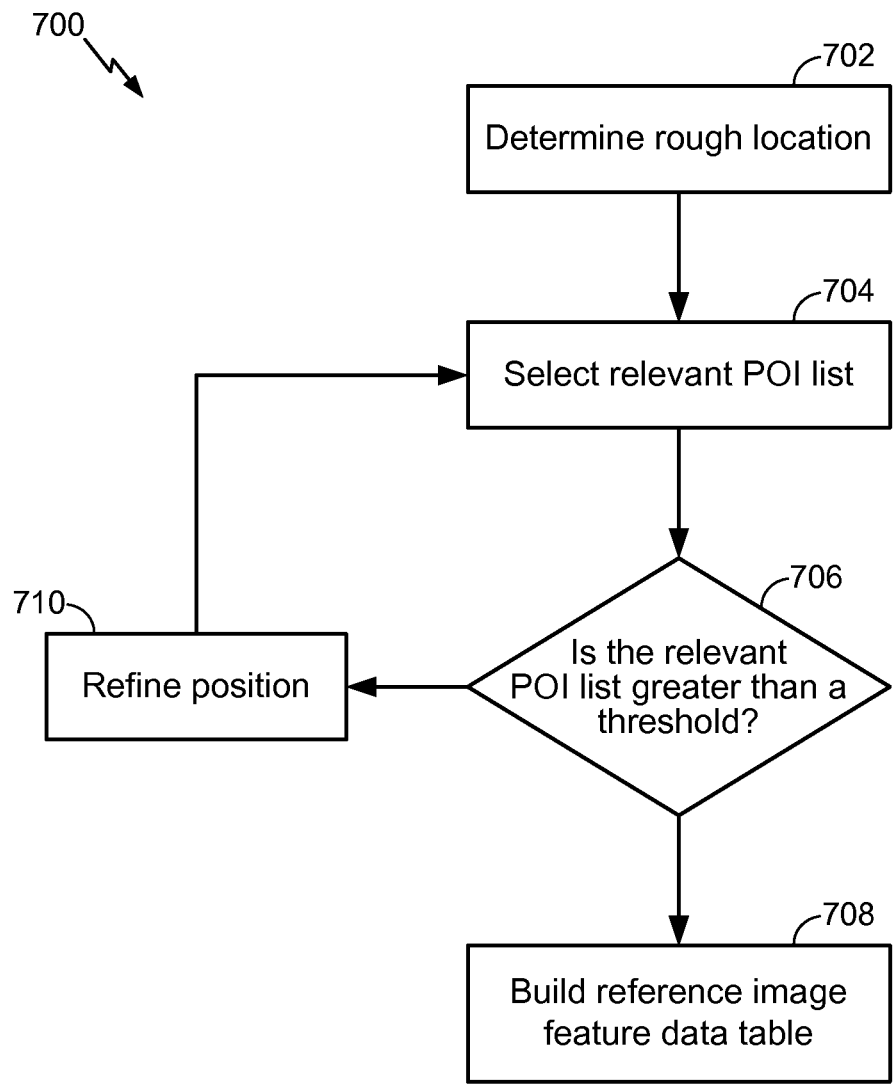
FIG. 7 is a block flow diagram of a process for refining a reference image feature data table.

Referring to FIG. 7, an exemplary process 700 for refining a reference image feature data table is shown. The process 700 is, however, an example only and not limiting. The process 700 can be altered, e.g., by having elements added, removed, rearranged, combined, performed concurrently, and/or having single elements split into multiple elements.

At stage 702, the mobile device 100 and/or position server can determine a rough location of the mobile device. In an example, the rough location can be determined based on WiFi or other radio signals detected by the mobile device 100. The rough location information can be provided to the image feature library server 242 to select a relevant POI list at stage 704. The relevant POI list can include a list of entities based on the rough location information or other criteria that is associated with the user and/or entities in a venue.

At stage 706, the number of POIs in the relevant POI list can be compared to a predetermined threshold. For example, the rough location information may indicate a relatively large area and therefore encompasses a larger number of POIs. The predetermined threshold value can vary based on application. In an example, the threshold can be based on the number of POIs in the list (e.g., 5, 10, 25), or based on the size of a corresponding reference image data table constructed using the POI list (e.g., 0.5 MB, 2 MB, 5 MB). The threshold can be determined based on the image processing capabilities of the image feature library server 242 and/or the mobile device 100. If the POI list is too large, then the intended efficiencies in image processing may be reduced. The threshold comparison at stage 706 provides a check to help ensure image processing efficiencies can be maintained. If the POI list is greater than the threshold, the rough location can be refined at stage 710. The position refinement can be based on obtaining additional measurements from the mobile device. The additional measurements can include using Round Trip Time (RTT) data, reporting additional SSIDs, providing GNSS measurements, or measurements received from additional sensors (e.g., inertial measurement unit, magnetometer, optical). The refined position information can be used to select the relevant POI list at stage 704.

At stage 708, if the number of relevant POIs on the list is less than or equal to the threshold, the image feature library server 242 (or the mobile device 100) can build a reference image feature data table. For example, a means for building a reference image feature data table can be a select query executing on the image feature library server 242 or on the mobile device 100. Referring to FIG. 5, the image feature data table can include records based on entities (e.g., an entity field 502). The image feature data table can be used in the image recognition process to recognize a logo or brand identity images. In an embodiment, the initial results of the image recognition process can be confirmed by concurrent or subsequent recognition of a neighboring logo or brand identity image. The confidence of the recognition can be further increased by recognizing a second logo for an entity. For example, a Starbucks® coffee store front may include specialized characters (e.g., corresponding to a first logo image feature field 504) and an icon (e.g. corresponding to a second logo image feature field 506). The presence and recognition of multiple logos can be used to confirm the recognition result.

Figure 8:
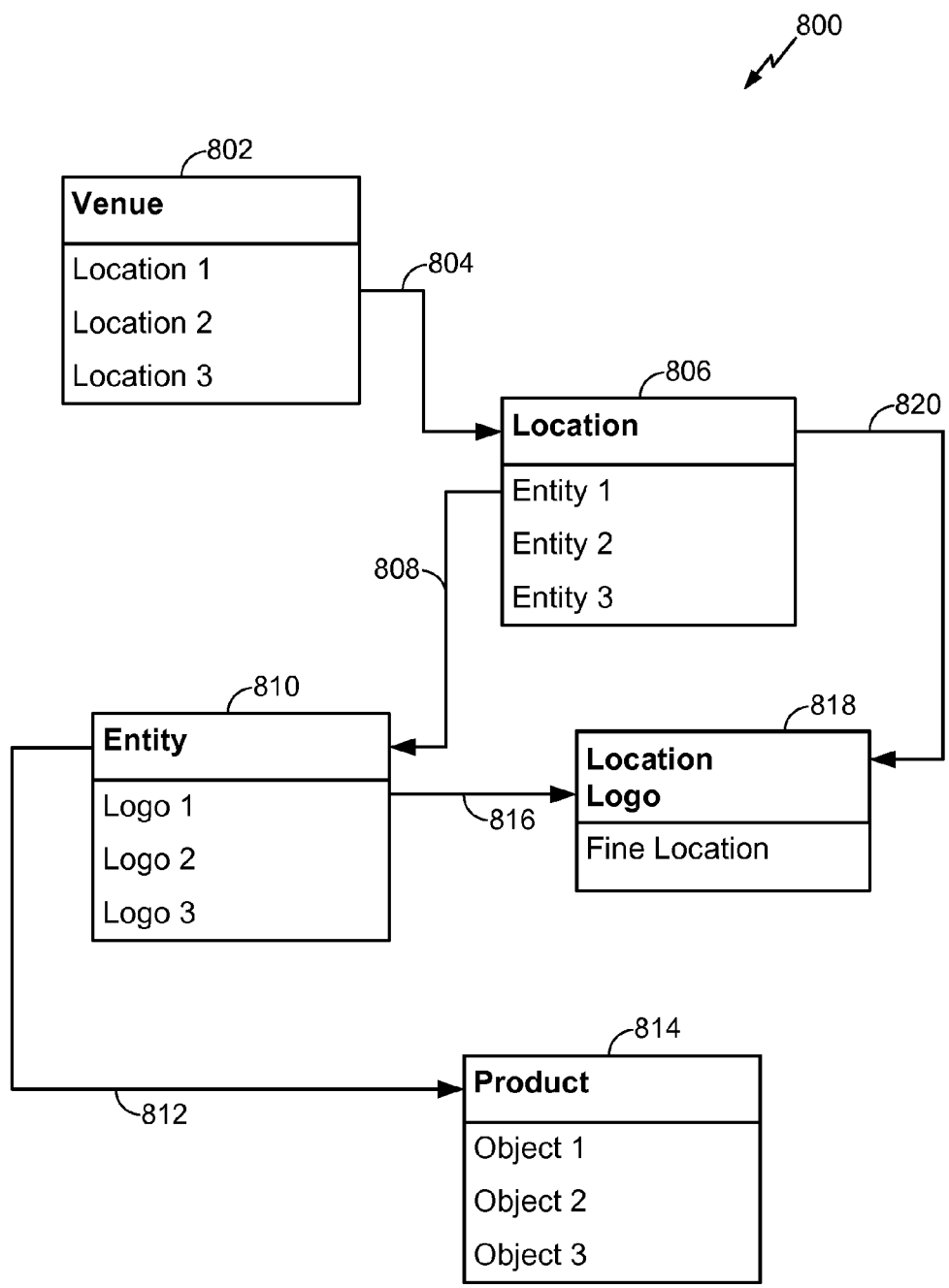
FIG. 8 is a relationship diagram of an exemplary data structure.

Referring to FIG. 8, a relationship diagram 800 of an exemplary data structure is shown. The objects in the relationship diagram 800 are exemplary only and not a limitation as other objects, data types, indexes and relationships may be used. The relationship diagram 800 includes a venue data object 802, a location data object 806, an entity data object 810, a product data object 814, and a location-logo data object 818. The venue data object 802 can be used to represent a venue (e.g., a shopping area) and includes a collection of location records (e.g., location 1, location 2, location 3, etc. . . . ). The location records can include preset location coordinates which correspond to the locations of network access points. The location information may also include the coverage area associated with network access points. The location information may be based on an intersection of coverage areas of two or more access points. The location information can be used as in index in a venue-location relationship link 804.

The location data object 806 can include a collection of entity records (e.g., entity 1, entity 2, entity 3, etc. . . . ). The entity records can correspond to a Point of Interest (POI). In an example, the entity records can indicate a business that is proximate to the linked location (i.e., when using the venue-location relationship link 804). The location area can correspond to the rough location area 404 as depicted in FIG. 4, and the entities can be the first and second entities 406*a*, 406*b*. The entity records can be indexed and can be used in a location-entity relationship link 808.

The entity data object 810 can include a collection of logo and branding image features (e.g., Logo 1, Logo 2, Logo 3, etc. . . . ). For example, referring to FIG. 5, the entity data object 810 can be a data table 500 of reference image features associated with an entity. The entity information may also be used in an entity-product relationship link 812. For example, the product data object 814 can include a collection of object records that are associated with an entity. The object records may include information about the products sold by the entity. The object records can include reference image fields of products to be used in image recognition. A collection of reference product images may be provided as a product image feature data table. The object records may include logos, product images, and branding image features for sub-brands that are associated with an image. For example, an entity may be a Toyota® dealership and a sub-brand may be associated with make of a car on the lot (e.g., Prius®, Camry®, etc. . . . ). In operation, a reference image feature data table for the sub-brands can be provided to the mobile device to be used in object recognition of the sub-brand items. When a sub-brand item is recognized, the location service information 312 module can be configured to provide sub-brand specific information (e.g., a Prius® related Augmented Reality application). The entity-product relationship link 812 is not limited to a single level as products can have sub-products, which can have sub-sub-products and so on. The relationship diagram 800 (i.e., data structure) provides relevant reference image feature data tables based on previous recognized results and the corresponding relationship links 804, 808, 812.

The location-logo data object 818 can be a data table with a primary and a secondary index and include fine location records that are associated with various location and logo combinations. The primary and secondary indexes can be based on the location information and the logo information respectively. A fine location record can represent an area from which a particular logo in a particular location can be viewed from. The relationships illustrated in FIG. 8 are exemplary only and not a limitation as other indexes, normalization schemes, and relationships may be used. In operation, a location record may correspond to a rough location in a venue. For example, the location record may include expected coverage area of a WiFi access point (e.g., a 100 m range). Within this location, one or more logos that are associated with one or more entities may be visible. A fine location record can include an area from which a particular logo in the location can be viewed from. The fine location records can be indexed based the particular logo (i.e., via a logo index link 816) and the location (i.e., via the location index link 820). A particular location and logo combination may have more than one fine location records.

Figure 9:
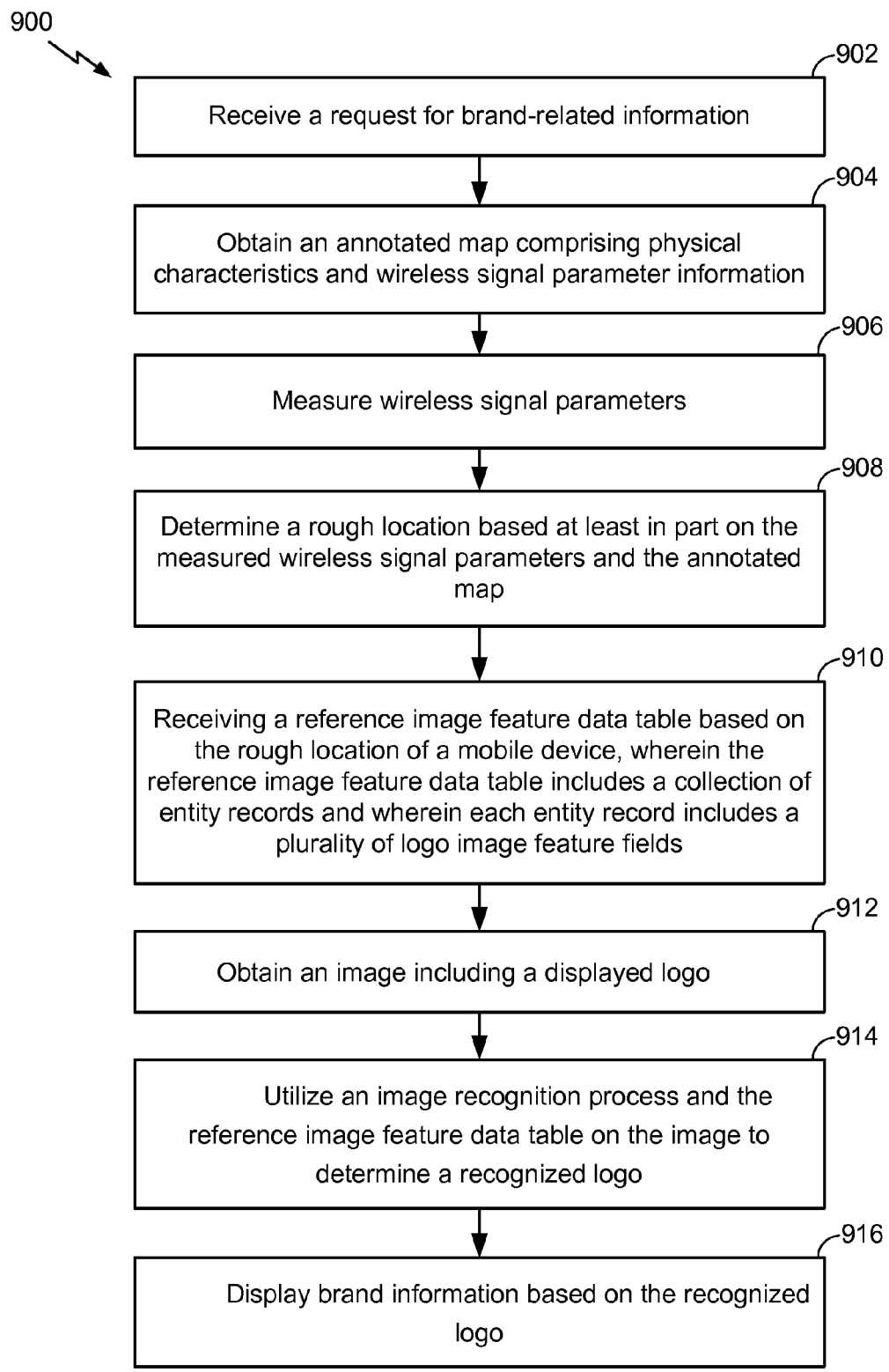
FIG. 9 is a block flow diagram of a process for displaying brand information.

Referring to FIG. 9, an exemplary process 900 for displaying brand information is shown. The process 900 is, however, an example only and not limiting. The process 900 can be altered, e.g., by having elements added, removed, rearranged, combined, performed concurrently, and/or having single elements split into multiple elements.

At stage 902, the mobile device can receive a request for brand-related information. In an example, a user can enter a gesture, or utilize other input mechanisms, to initiate the process 900. The request may be to execute an application on the mobile device 100, or to active a command object within an application. Other triggers may also be used to initiate a request for brand-related information.

At stage 904, the mobile device 100 can obtain an annotated map comprising physical characteristics and wireless signal parameter information. The annotated map may be stored locally in memory 140, or may be obtained by sending a request to the image feature library server 242, or another position server, and receiving the annotated map via the network 230. The physical characteristics in the annotated map may include information associated with the structures within the map (e.g., wall, corridors, doors, windows, stairwells, etc. . . . ), and the wireless signal parameter information may include signal information that is associated with wireless transmitting devices 210 that are located within the area defined by the map. The signal information may include signal strength, code phase, round-trip delay, transmitter identification information (e.g., identification of one or more transmitters such as SSID, WLAN MAC addresses associated with transmitters at known locations, CDMA pn offsets), and transmitter timing information. Other parameters may also be used.

At stage 906, the mobile device may measure wireless signal parameters. The mobile device 100 may receive multiple wireless signals 123, 136 being transmitted by multiple wireless transmitting devices 210, 220. The measured wireless signal parameters may include signal strength, code phase, round-trip delay, transmitter identification information (e.g., identification of one or more transmitters such as SSID, WLAN MAC addresses associated with transmitters at known locations, CDMA pn offsets), and transmitter timing information. At stage 908, the mobile device 100 or the image feature library server 242 may determine a rough location of the mobile device 100 based at least in part on the measured wireless signal parameters and the annotated map. Determining a rough location of the mobile device 100 based on received wireless signals may depend on whether the mobile device 100 is within geographic reception areas of wireless transmitters 210 transmitting the received wireless signals, and also where the mobile device 100 is positioned within such geographic reception areas. For example, a wireless signal as received at a mobile device 100 may become weaker as a range to an associated wireless transmitter 210 increases. Signal strength of a received wireless signal may not necessarily be closely related to a range to a wireless transmitter transmitting the received wireless signal, however. For example, other factors such as RF obstructions or interferences to wireless signal transmission may diminish strength of a wireless signal at reception.

If a particular wireless signal identifiable as being transmitted by a particular wireless transmitter 210 is received at a mobile device 100, the mobile device 100 may be assumed to be within a particular range of the particular wireless transmitter 210 and positioned within a geographic region. For example, if geographic transmission boundaries corresponding to a transmission range of wireless transmitter 210 are known, then by having a mobile device 100 receive wireless signal from wireless transmitter 210, the rough location mobile device 100 may be ascertained as being within geographic transmission boundaries of wireless transmitter 210.

In particular implementations, a mobile device 100 may obtain a rough position from processing multiple wireless signals transmitted over multiple respective wireless signal interfaces or links. The mobile device 100 may search in attempt to detect wireless signal parameters information transmitted in one or more of such multiple wireless signals. Such wireless signal parameter information transmitted in selected wireless signals associated with particular transmitters may be detected or obtained by searching and processing the selected wireless signals. Such signal parameters may include, for example, signal strength, code phase, round-trip delay, transmitter identification information (e.g., identification of one or more transmitters such as WLAN MAC addresses associated with transmitters at known locations, CDMA pn offsets), transmitter timing information. Transmitter timing information may include, for example, one or more error estimates associated with the timing of a signal transmitted by a transmitter, a relationship between a framing structure of a signal transmitted by at least one transmitter and a standardized time source.

In this context, "search" or "searching" a wireless signal transmitted from a wireless transmitter may include any one or a combination of signal processing techniques for use in detecting or measuring particular characteristics of and/or obtaining information transmitted in a received wireless signal (e.g., for the purpose of estimating a position of a receiver). Such signal processing techniques may include, for example, digital sampling and filtering, analog filtering, coherent or incoherent integration, correlation, application of discrete Fourier transforms, peak detection and related logic, data channel or packet processing, just to name few examples.

At stage 910, a mobile device 100 is configured to receive a reference image feature data table based on a rough location of the mobile device 100. The reference image feature data table can include a collection of entity records and the corresponding logo image feature fields. The mobile device 100 can include an algorithm stored in the memory 140 configured to enable the processor 111 to provide location information via one or more wireless signals 123, 136 and the network 230 to the image feature library server 242. The location information can be the rough location of the mobile device determined at stage 908. The image feature library server 242 can be configured to receive the location information as a request 330, and then determine a list of entities based on the received location information. For example, the instructions 306 can include an algorithm for searching a data structure for entities based on the location information. The image feature library server 242 is configured to determine a list of entities based on the location information and determine the corresponding logo information that corresponds to the list of entities. For example, the image feature library server 242 can include an algorithm to create a data table 500 including entities and their corresponding logos. The data table 500 is an example of a reference image feature data table and can include a collection of entity records and their corresponding logos. The data table 500 can be provided to the mobile device 100 via the network 230 as one or more data files. In an embodiment, the data table 500 can be provided in response to receiving a request 330 from the mobile device 100. The data table 500 can be provided to the mobile device 100 as an application (e.g., previously stored on the memory 140), and configured for subsequent access by the processor 111. The data table 500 can be stored as the feature data table 143 for use with an image recognition algorithm.

At stage 912, the mobile device 100 can be configured to obtain an image including a displayed logo. For example, the image capture module 130 and the sensor 132 can be used to obtain an image of a store front. Referring to FIG. 4, the image can be of a first store front 408a and can include a logo or other trade dress information (i.e., the GAP logo). The image can be stored in the memory 140 for processing with an image recognition algorithm.

At stage 914, the mobile device 100 can be configured to utilize an image recognition process and the reference feature data table on the image to determine a recognized logo. The processor 111 or other DSP(s) 112 may be configured to execute an image process algorithm including a feature extraction module 142. The features in the image of a first store front 408a can be compared to the logo images in the reference image feature data table 143. Features may be extracted using algorithms such as Scale-Invariant Feature Transform (SIFT), Speeded-UP Robust Feature (SURF), Nearest Feature Trajectory (NFT), etc. . . . These algorithms are exemplary only and not limiting as other algorithms such as proprietary corner detection-type approaches may be used. The result of the image recognition process can determine a recognized logo.

At stage 916, the mobile device 100 can be configured to display brand information based on the recognized logo. The brand information can be additional information a user may want to know about an entity that is associated with the recognized logo. For example, upon recognition of the logo, the mobile device 100 may activate the area of the display 134 occupied by the image of the logo such that when the user touches, or otherwise activates the area, a web browser will open to a URL associated with the entity. Other brand information may include targeting marketing information, such as information regarding sales or other promotions associated with the entity. The brand information may be an augmented reality application that is presented in combination with the logo image on the display 134. The augmented reality information may be an interactive kiosk application to enable the user to obtain more information about services and products that are associated with the entity. The brand information can be location services such as a floor map of the retail location that is associated with the logo. Combinations of augmented reality applications and location services may be used, for example, to provide a user with step-by-step directions to a specific area, department or point of interest within the retail location (e.g., hardware, shoes, housewares, rest rooms).

In an embodiment, the brand information includes product information. The mobile device 100 is configured to send a request 330 to the image feature library server 242. The request indicates the logo, or other trade information, determined at stage 906. The image feature library server 242 is configured to query one or more product data tables based on the received request and create a product data object 814. The product data object 814 can include product information such as price, inventory quantity, and shelf location. The product data object can be a reference image feature data table to be used by the mobile device 100 in the recognition of products (e.g., sub-brands) that are associated with the entity. For example, the user can obtain an image of a product with the image capture module 130, and the feature extractor module 142 can be used with the reference images in the product data object to recognize the product in the image.

Figure 10:
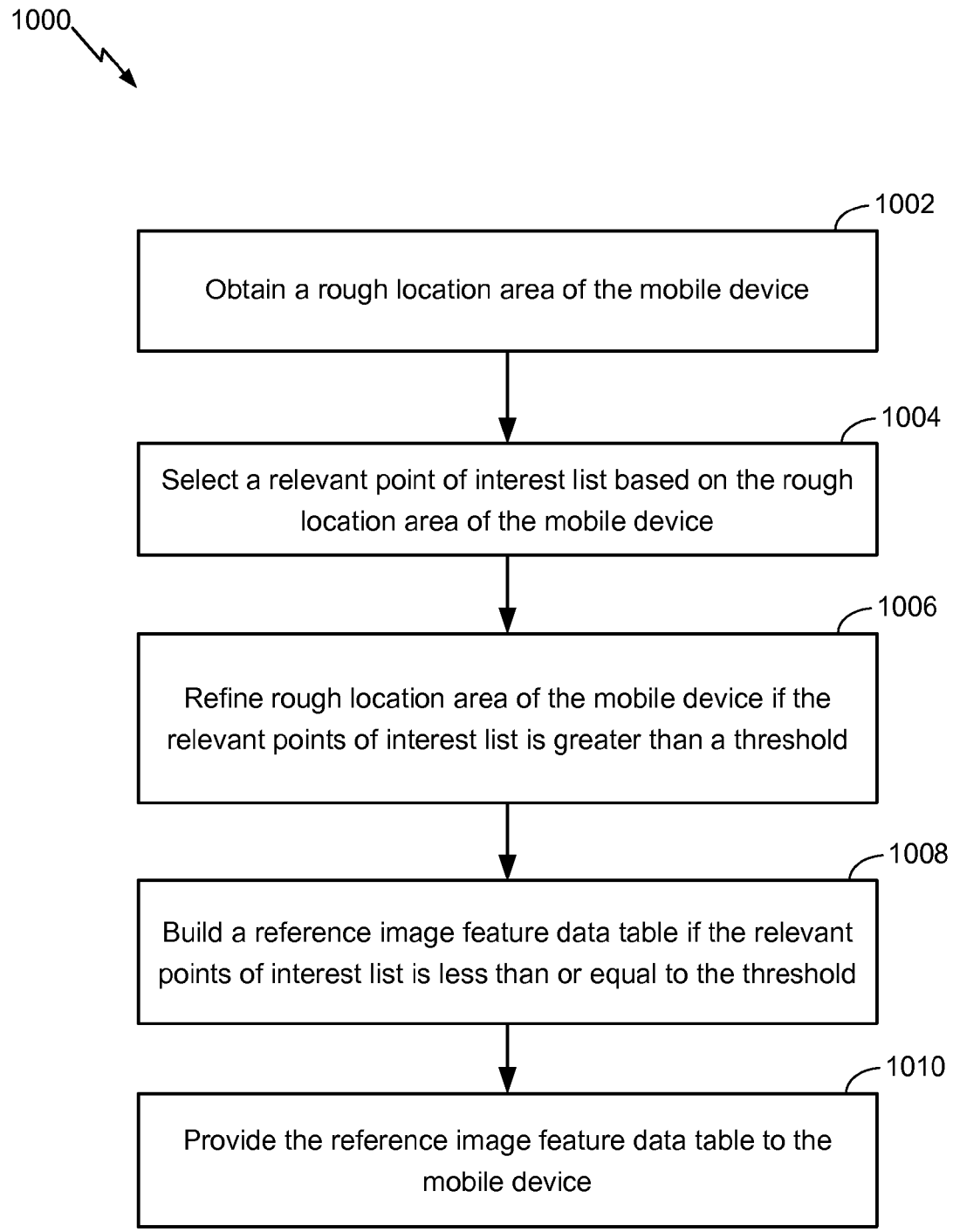
FIG. 10 is a block flow diagram of a process for providing a reference image feature data table to a mobile device.

Referring to FIG. 10, an exemplary process 1000 for providing a reference image feature data table to a mobile device is shown. The process 1000 is, however, an example only and not limiting. The process 1000 can be altered, e.g., by having elements added, removed, rearranged, combined, performed concurrently, and/or having single elements split into multiple elements.

At stage 1002, the image feature library server 242 obtains a rough location area of the mobile device 100. The rough location area can be based on a SSID of an access point 210. For example, the mobile device 110 can provide the SSID to the image feature library server 242 via the network 230, and the image feature library server 242 can communicate with a position server to determine the rough location area of the mobile device 100. In and embodiment, the mobile device 100 or a position server sends the rough location area to the image feature library server 242 as part of a request 330. The rough location area need not be dependent on an SSID and can be computed by other positioning techniques.

At stage 1004, the image feature library server 242 can select a relevant point of interest list based on the rough location area of the mobile device 100. The image feature library server 242 can use the received rough location area in a searching algorithm (e.g., a SQL Select query) to select records from the rough position information 310 information in the memory 304. The result of the search can be list of points of interest that are within a distance of the rough location of the mobile device. For example, referring to FIG. 4, the points of interest list based on the rough location area 404 could include Nordstrom, Gap and Aldo.

At stage 1006, the image feature library server 242 can be configured to refine the rough location area of the mobile device if the relevant points of interest list is greater than a threshold. The size of the rough location area may encompass many points of interest and therefore result in a large number of points of interest and a larger corresponding list of related reference image features. The size of the possible resulting image feature data table (i.e., in terms of memory and transmission bandwidth) may overload the capabilities of the mobile device 100 or the network 230. The image feature library server 242 is configured to compare the number of items on the points of interest list to a predetermined threshold and then refine the rough location area if the number of items is greater than the threshold. The threshold value can be an integer (e.g., 2, 3, 8, 12, 20, etc. . . . ) that is based on the performance aspects of the mobile device 100 and the network 230. The threshold value may also be based on the size of a possible reference image feature data table (e.g., 10 MB, 20 MB, 50 MB, etc. . . . ). That is, the image feature library server 242 can iteratively build a reference image feature data table based on the relevant points of interest list, and then compare the size of each resulting reference image feature data table to the threshold. The rough location area can be refined by receiving additional position information from the mobile device (e.g., RSSI, RTT, GNSS information). The rough location area can be refined by obtaining additional SSIDs (e.g., to determine intersecting coverage areas), or by using historical location data. Other statistical processes for refining the rough location area may also be used (e.g., routing heat maps, number of recognition results for an entity, time of day of request).

At stage 1008, the image feature library server 242 is configured to build a reference image feature data table if the relevant points of interest list is less than or equal to the threshold. Continuing the example above, with further reference to FIGS. 4 and 5, if the threshold value is 2 then the rough location area 404 could be refined to limit the relevant point of interest list to only two entities (i.e., Gap and Aldo). The corresponding reference image feature data table could include indexes associated with the Gap and Aldo entities and their corresponding logos. That is, the image feature data table could be similar to the data table 500 but limited to only the two entities and the reference image features corresponding to their logos and/or other brand identifiers. At stage 1010, the image feature library server 242 is configured to provide the reference image feature data table to the mobile device 100. For example, the reference image feature data table can be transmitted as a data package via the network 230 and the wireless signal 123. In an embodiment, the mobile device 100 can perform the functions of the image feature library server 242 described above. The process 1000 for providing a reference image feature data table to a mobile device can be embodied as an application which is loaded onto the mobile device. For example, a shopping mall may create a venue specific application that includes entity and logo data tables, as well as network location information (e.g., access point locations). A user can download the application onto their mobile device to be utilized when they visit the venue. The application can be updated as entity, logo, or position information is changed.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of a computer program product containing algorithms or symbolic representations of operations on binary digital electronic signals stored within a memory of a specific apparatus or special purpose computing device or platform. In the context of this particular specification, the term specific apparatus or the like includes a general purpose computer once it is programmed with processor-executable instructions to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "analyzing", "obtaining", "identifying", "associating", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable, or processor-executable computer, storage medium can be organized into one or more code segments and typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state. In general, a code segment is one or more computer-executable instructions stored in a computer-readable storage medium, or other memory device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for using a camera on a mobile device to display brand information, comprising:
    receiving a request for brand-related information;
    obtaining an annotated map comprising physical characteristics and wireless signal parameter information;
    measuring wireless signal parameters;
    determining a rough location based at least in part on the measured wireless signal parameters and the annotated map;
    receiving a reference image feature data table based on the rough location of the mobile device, wherein the reference image feature data table includes a collection of entity records and wherein each entity record includes a plurality of logo image feature fields;
    obtaining an image including a displayed logo;
    utilizing an image recognition process and the reference image feature data table on the image to determine a recognized logo; and
    displaying brand information based on the recognized logo.

2. The method of claim 1 comprising obtaining an image including a plurality of logos, utilizing the image recognition process and the reference image feature data table on the image to determine a plurality of recognized logos, and displaying a respective brand information for each of the plurality of recognized logos.

3. The method of claim 1 wherein displaying brand information includes executing an augmented reality application that is associated with the brand information.

4. The method of claim 1 comprising receiving a product image feature data table based on the recognized logo, wherein the product image feature data table includes one or more reference image fields of products that are associated with the recognized logo.

5. The method of claim 4 comprising obtaining an image of a product and utilizing the image recognition process and the product image feature data table on the image of the product to determine information about the product.

6. A mobile device for providing location-based brand detection, comprising:
    an image capture module;
    a memory configured to store a reference image feature data table, wherein the reference image feature data table comprises at least one entity record including a plurality of logo image feature fields;
    a processor programmed to:
        measure wireless signal parameters;
        determine a rough location of the mobile device based on the wireless signal parameters;
        receive the reference image feature data table, wherein the at least one entity record is associated with the rough location;
        perform an image recognition process on an image obtained by the image capture module based on the reference image feature data table; and
        display brand information based on a result of the image recognition process.

7. The mobile device of claim 6, wherein the processor is programmed to send the wireless signal parameters to a server.

8. The mobile device of claim 6, wherein the reference image feature data table includes position information and the processor is programmed to determine a refined position of the mobile device based on a result of the image recognition process and the position information.

9. The mobile device of claim 6, wherein the processor is programmed to obtain an annotated map.

10. The mobile device of claim 9, further comprising a graphic display, wherein the processor is programmed to output a graphic map including the brand information to the graphic display.

11. The mobile device of claim 10, wherein the graphic map includes a current position of the mobile device.

12. An apparatus for displaying brand information, comprising:
    a memory;
    at least one processor coupled to the memory and configured to:
        receive a request for brand-related information;
        obtain an annotated map comprising physical characteristics and wireless signal parameter information;
        measure wireless signal parameters;
        determine a rough location of a mobile device based at least in part on the measured wireless signal parameters and the annotated map;
        receive a reference image feature data table based on the rough location of the mobile device, wherein the reference image feature data table includes a collection of entity records and wherein each entity record includes a plurality of logo image feature fields;

obtain an image including a displayed logo;

utilize an image recognition process and the reference image feature data table on the image to determine a recognized logo; and display brand information based on the recognized logo.

13. The apparatus of claim 12 wherein the at least one processor is further configured to obtain an image including a plurality of logos, utilize the image recognition process and the reference image feature data table on the image to determine a plurality of recognized logos, and display a respective brand information for each of the plurality of recognized logos.

14. The apparatus of claim 12 wherein the at least one processor is further configured to execute an augmented realty application that is associated with the brand information.

15. The apparatus of claim 12 wherein the at least one processor is further configured to receive a product image feature data table based on the recognized logo, wherein the product image feature data table includes one or more reference image fields of products that are associated with the recognized logo.

16. The apparatus of claim 15 wherein the at least one processor is further configured to obtain an image of a product and utilize the image recognition process and the product image feature data table on the image of the product to determine information about the product.

17. An apparatus for using a camera on a mobile device to display brand information, comprising:

means for receiving a request for brand-related information;

means for obtaining an annotated map comprising physical characteristics and wireless signal parameter information;

means for measuring wireless signal parameters;

means for determining a rough location based at least in part on the measured wireless signal parameters and the annotated map;

means for receiving a reference image feature data table based on the rough location of the mobile device, wherein the reference image feature data table includes a collection of entity records and wherein each entity record includes a plurality of logo image feature fields;

means for obtaining an image including a displayed logo;

means for utilizing an image recognition process and the reference image feature data table on the image to determine a recognized logo; and means for displaying brand information based on the recognized logo.

18. The apparatus of claim 17 comprising means for obtaining an image including a plurality of logos, means for utilizing the image recognition process and the reference image feature data table on the image to determine a plurality of recognized logos, and means for displaying a respective brand information for each of the plurality of recognized logos.

19. The apparatus of claim 17 wherein the means for displaying brand information includes means for executing an augmented realty application that is associated with the brand information.

20. The apparatus of claim 17 comprising means for receiving a product image feature data table based on the recognized logo, wherein the product image feature data table includes one or more reference image fields of products that are associated with the recognized logo.

21. The apparatus of claim 20 comprising means for obtaining an image of a product and means for utilizing the image recognition process and the product image feature data table on the image of the product to determine information about the product.

22. A non-transitory computer program product residing on a processor-executable computer storage medium, the computer program product comprising processor-executable instructions configured to cause a processor to:

receive a request for brand-related information;

obtain an annotated map comprising physical characteristics and wireless signal parameter information;

measure wireless signal parameters;

determine a rough location of a mobile device based at least in part on the measured wireless signal parameters and the annotated map;

receive a reference image feature data table based on the rough location of the mobile device, wherein the reference image feature data table includes a collection of entity records and wherein each entity record includes a plurality of logo image feature fields;

obtain an image including a displayed logo;

utilize an image recognition process and the reference image feature data table on the image to determine a recognized logo; and display brand information based on the recognized logo.

23. The computer program product of claim 22 further comprising instructions configured to cause a processor to obtain an image including a plurality of logos, utilize the image recognition process and the reference image feature data table on the image to determine a plurality of recognized logos, and display a respective brand information for each of the plurality of recognized logos.

24. The computer program product of claim 22 further comprising instructions configured to cause a processor to execute an augmented realty application that is associated with the brand information.

25. The computer program product of claim 22 further comprising instructions configured to cause a processor to receive a product image feature data table based on the recognized logo, wherein the product image feature data table includes one or more reference image fields of products that are associated with the recognized logo.

26. The computer program product of claim 25 further comprising instructions configured to cause a processor to obtain an image of a product and utilize the image recognition process and the product image feature data table on the image of the product to determine information about the product.

* * * * *